(12) United States Patent
Fawcus

(10) Patent No.: US 7,577,737 B2
(45) Date of Patent: Aug. 18, 2009

(54) METHOD AND APPARATUS FOR CONTROLLING DATA TO BE ROUTED IN A DATA COMMUNICATIONS NETWORK

(75) Inventor: Derek Fawcus, Edinburgh (GB)

(73) Assignee: Cisco Technology, Inc., San Jose, CA (US)

( * ) Notice: Subject to any disclaimer, the term of this patent is extended or adjusted under 35 U.S.C. 154(b) by 812 days.

(21) Appl. No.: 10/950,004

(22) Filed: Sep. 23, 2004

(65) Prior Publication Data

US 2006/0064484 A1 Mar. 23, 2006

(51) Int. Cl.
*G06F 15/173* (2006.01)
(52) U.S. Cl. .............. 709/224; 709/203; 709/223; 709/229; 709/238; 370/235; 370/352; 370/395.53; 370/401; 370/431; 726/22
(58) Field of Classification Search ........... 709/203, 709/223, 224, 229, 238; 370/235, 352, 395.53, 370/401, 431; 726/23, 22; 713/188
See application file for complete search history.

(56) References Cited

U.S. PATENT DOCUMENTS 7,389,537 B1 * 6/2008 Callon et al. ............ 726/22
2004/0148520 A1 * 7/2004 Talpade et al. ............ 713/201
2004/0223500 A1 * 11/2004 Sanderson et al. ..... 370/395.53
2005/0193429 A1 * 9/2005 Demopoulos et al. ....... 726/23

OTHER PUBLICATIONS

Netopia, "NAT ad the Basic Firewall," Netopia NQG_039, located on the internet at <http://www.netopia.com/support/hardware/technotes/NQG_039.html>, 4 pages.
Shinder, Thomas, "Configuring Windows Server 2003-based ISA Server Firewall/VPN Server to Accept inbound NAT-T L2TP/IPSec," ISAserver.org, Aug. 7, 2003, 15 pages.

* cited by examiner

*Primary Examiner*—Yves Dalencourt
(74) *Attorney, Agent, or Firm*—Hickman Palermo Truong & Becker LLP

(57) ABSTRACT

A method of controlling data to be routed in a data communications network, the network comprising at least a first network node connected via a communications link to a second network node, the method comprising the computer-implemented steps of: monitoring communications at the first network node; in response to data received by the first network node, sending a filter control message, said filter control message including information for updating filter characteristics at the second network node; receiving at the second node a filter control message; and in response to the filter control message, updating filter characteristics at the second network node.

29 Claims, 5 Drawing Sheets

METHOD AND APPARATUS FOR CONTROLLING DATA TO BE ROUTED IN A DATA COMMUNICATIONS NETWORK

FIELD OF THE INVENTION

The present invention generally relates to communications networks. The invention relates more specifically to a method and apparatus for controlling data to be routed in a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of links (communication paths such as telephone or optical lines) and nodes (usually routers directing the packet along one or more of a plurality of links connected to it) according to one of various routing protocols.

In the network, some nodes represent end systems (such as printers, fax machines, telephones, PC's etc) whereas other nodes represent network devices (e.g. switches, routers etc). The data packets are sent around the network from a source to a destination in accordance for example with routing information shared among the nodes of the network. As the network comprises a plurality of interconnected nodes, the network is fairly robust.

The links between the nodes may be high bandwidth links (e.g. Local Area Network links) or low bandwidth links (e.g. standard telephone lines or ADSL links). These links may become congested with data being sent to a destination. This may result in the rate of useful data communication between two nodes being reduced as the bandwidth of the link is taken up by excessive traffic.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for controlling data to be routed in a data communications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of controlling data to be routed in a data communications network
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for controlling data to be routed in a data communications network, the network comprising at least a first network node connected via a communications link to a second network node. The method comprises monitoring communications at the first network node. In response to the monitoring at the first network node, a filter control message is sent to the second network node, said filter control message including information for updating filter characteristics at the second network node. When the second node receives a filter control message from the first network node, it updates filter characteristics at the second network node.

In other aspects, the invention encompasses a computer apparatus and a computer-readable medium configured to carry out the foregoing steps.

2.0 Structural and Functional Overview

Figure 1:
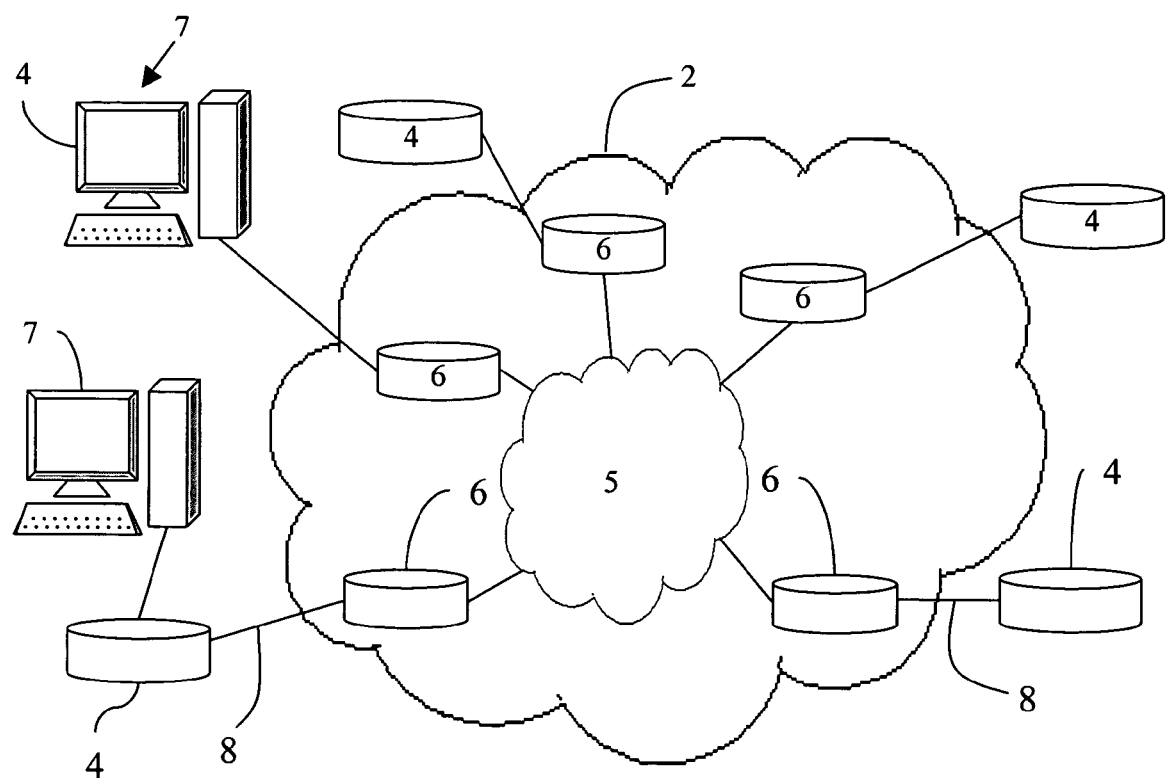
FIG. 1 is a block diagram that illustrates an overview of a data communications network.

A data communications network comprises a plurality of interconnected nodes. Traffic between nodes is routed from a source to a destination via communications links and nodes of the network. FIG. 1 is an illustrative network diagram showing an example of a data communications network. In the network illustration of FIG. 1, a distributed network 2 is shown having a plurality of nodes comprising Customer Edge (CE) devices 4 and Provider Edge (PE) routers 6 connected to an interconnected network 5 (which comprises other nodes and communications links). Typically the CE devices 4 are devices (such as routers or Personal Computers 7) belonging to a customer, the PE routers 6 are part of one or more service providers' networks and the interconnected network 5 is the internet.

Each Provider Edge router 6 is connected to a customer edge (CE) device 4 which is provided at one or more customer sites outside the distributed network 2. Each CE device 4 is connected by a communications link 8 to a Provider Edge (PE) router 6 of the distributed network 2. A CE device may take many forms: typical examples of a CE device are a router (such as an ADSL router), a plug-in NAT box or a PC (Personal Computer) 7, although these examples of CE devices are not intended to be limiting.

The type of the communications link 8 is not material to the operation of the method described. As examples, which are not intended to be limiting, the communications link 8 may be an ADSL link, a POTS (Plain Old Telephone Service) link, an ISDN link etc.

Figure 2:
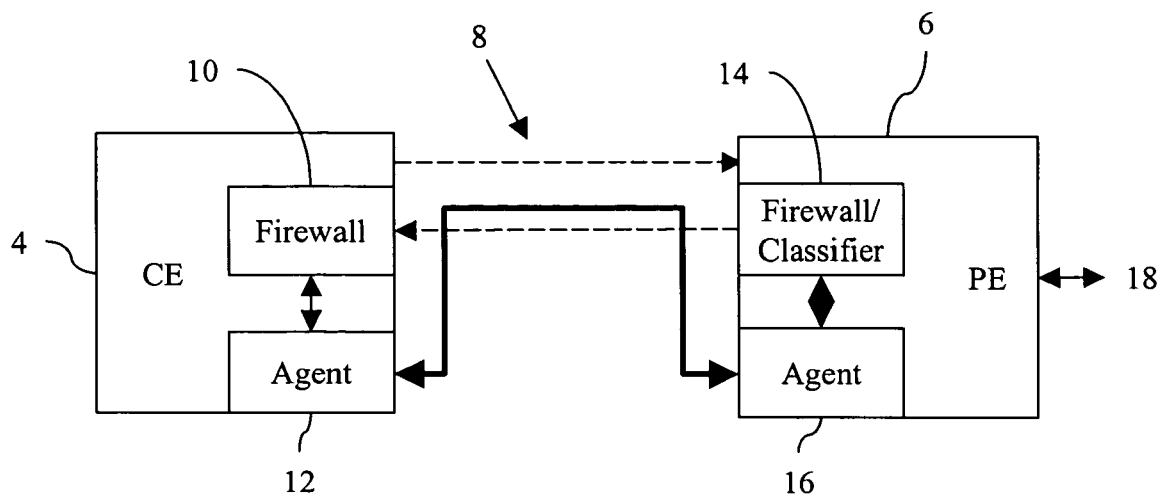
FIG. 2 is a schematic diagram illustrating a first embodiment of part of a data communications network.

FIG. 2 shows a schematic diagram of the network shown in FIG. 1. At one end of a communications link 8 is a CE device 4 that has a stateful firewall 10. At the other end of the communications link 8 is a PE router 6. The communications link 8 may be a bi-directional link or a plurality of unidirectional links between the PE and the CE.

The firewall 10 provides security for the customer edge sites, for instance through an adaptive security algorithm (ASA) and the use of "stateful" information. Each time a connection is established from a host at a customer site accessing the Internet 5 through the firewall 10, the information about the connection is logged in a stateful session flow table of the firewall 10. The table contains information such as the source and destination addresses, port numbers, sequencing information, and additional flags for each connection associated with that particular host. This information creates a connection object in the firewall. Thereafter, inbound packets are compared against session flows in the connection table and are permitted through the firewall 10 only if an appropriate connection exists to validate their passage. This connection object is temporarily set up until the connection has been terminated at which time the connection object is terminated. An example of a connection is a Transmission Control Protocol (TCP) connection.

The CE includes a stateful firewall 10 and a local agent 12 which, in use, extracts from the firewall 10 knowledge of the state of active communications and, on the basis of policies and rules, decides how packets from a source should be treated, as will be described further below. As well as a firewall on a router, the 'state' for communications may be maintained in a host stack. For instance, if CE 4 is a computer, then a firewall as such may not be required, as the CE agent 12 may extract data from an IP stack database of active communications. In this case the CE agent 12 on the computer is able to directly extract that knowledge from the computer host stack, instead of having to infer the knowledge based upon the flow of packets that are occurring across the link 8.

The PE router 6 includes or is associated with a filter 14 which is provided in the downlink direction between the PE router 6 and the end of the communications link 8. The filter 14 comprises a plurality of packet filters or classifiers which determine how packets received by the PE from the network are managed. The filter may typically comprise a plurality of access lists (also known as Access Control Lists ACLs) which control access from the router for a number of services (for example, to prevent packets with a certain IP address from leaving a particular interface on the router). The classifiers assign packet flows (source and masks) to one of a set of queues for the PE router. The following queues may be provided; drop, low bandwidth, high bandwidth, priority. These may be used to meet Quality of Service (QoS) criteria in the PE to CE direction. The priority queue is used for inter-agent communications. This may be low bandwidth but high priority, which results in packets assigned to the queue having first access to the communications link 8 from the PE to the CE.

The CE device 4 and the PE 6 communicate control messages via a communication protocol that allows the CE agent 12 to communicate to the PE agent 16 which flows have been opened up at the CE end and with what expected bandwidth and/or behavior. The agent 12 running on the CE device 4 generates control messages to send to the PE router 6 and an agent 16 running on the PE router 4 accepts the control message from the CE agent 12 and on the basis of the message from the CE agent 12 updates one or more of the packet classifiers of the filter 14. Thus the agents 12 and 16 dynamically adjust the quality of service rules at the PE.

The filter 14 is arranged to assign by default all sources (0.0.0.0/0) to one of the queues. For instance, the filter may be arranged to assign by default all sources to the low bandwidth queue so that the bandwidth of the communication link 8 between the PE 6 and the CE 4 is conserved. Alternatively, since the inter-agent communication has priority access to the communication link 8, the default classification on the PE 6 could be the high bandwidth flow. This would allow the CE 4 to receive data via the high bandwidth queue but to throttle the link when the CE agent 12 decides something untoward is occurring or control is required. This set up has the additional advantage that if the PE agent 16 fails for some reason, the default 'fail safe' mode is a full bandwidth link rather than a reduced bandwidth link. The classifiers of the filter 14 determine exceptions to the default situation of the filter 14.

The CE agent 12 monitors the database of active communications information that is maintained by the firewall 10. Thus the CE agent detects when changes occur in the database. As the CE agent 12 determines that new flows are open, the CE agent 12 communicates to the PE agent 16 using the communication protocol that a flow has been opened, identifies the flow and indicates the queue to which it is to be assigned. In response, the agent 16 assigns the identified source/mask to a high bandwidth queue. Hence flows which are actually being used by the CE (and not simply discarded at the CE) are allowed to use the maximum received bandwidth of the link. Likewise, when the CE agent 12 detects that flows are closed, it communicates this to the PE agent and the PE agent 16 updates the filter 14 to remove the identified source/mask from mapping to the high bandwidth queue. Hence any subsequent packets from that source will end up being mapped back to the low bandwidth queue.

The drop queue has sources mapped to it by the stateful firewall 10 when and if the stateful firewall 10 detects some form of attack coming from a given source. There are many ways that a firewall can detect an attack: for instance packets from a particular source being sent regularly and at short intervals to the CE. In response to the firewall 10 detecting a form of attack, the firewall 10 communicates to the PE agent 16 using the communication protocol that a particular flow should be dropped. In response, the PE agent updates the filter 14 by assigning the identifying source/mask to the drop queue. Thus, such sources are prevented from using even the minimum share of the link 8 allowed by the low bandwidth queue and hence from overflowing the low bandwidth queue.

The CE firewall 10 is also arranged to perform flow aggregation such that it can detect when more than one flow can be mapped by the same classifier of the filter 14. This may be based upon having more than one flow between the same set of addresses, having more than one flow from the same source, or manipulating the mask used by the filter 14 to allow flows to be aggregated (i.e. flows from sources differing by only a small number of bits). This allows the firewall 10 to use only a small number of classifier resources on the PE router. The PE router 6 may be arranged to communicate to the CE firewall 10 how many source/mask entries it is allowed to use.

The low bandwidth queue may have a queuing policy such that a single source is unable to consume all of the available bandwidth of the low bandwidth. This may be achieved by a simply random drop policy when the low bandwidth queue becomes significantly full or separate queues (per source)

may be funneled into one low bandwidth queue. The high bandwidth queue may have a fair share queuing policy.

Advantageously the CE firewall 10 may inform the PE agent 16 about the bandwidth requirement of a given flow. For instance an n bit number representing a fraction of the link bandwidth may be provided. This would allow the CE firewall 10 to shape the traffic flows based upon criteria it chooses (e.g. based upon L4 information).

Another enhancement would be to supply the PE agent 16 with the destination address and mask as well as the source address and mask. This would allow different hosts on the customer site which all use the same CE device 4 to have different flow behaviors from a given source.

Thus the PE classifier and received traffic shaper 14 at the PE end of the communications link 8 is controlled by a CE agent 12 running at the CE 4. The CE agent 12 accesses a database of active communications maintained by the CE 4. This prevents the downlink bandwidth of the link being taken up by packets that will be discarded by the CE on receipt. The policies for the firewall, classifier and shaper are locally controlled from the CE end and the majority of expensive resources reside in the CE firewall.

Having the firewall policy controlled locally at the CE is easier for a customer to modify than if a policy is in a distant PE router. This also allows the customer the opportunity to investigate if the firewall rules are correct. Having the firewall 10 control a classifier and shaper 14 at the distance PE router 6 means that the link bandwidth is not wasted on packets that, on receipt by the CE, would simply be discarded by the firewall.

Having the firewall local to the CE and the classifier/shaper remote means that the system is also very scaleable. The majority of resources (e.g. the memory required to track the flow to the CE) are maintained by the numerous CE firewalls of the network, whereas all a PE router needs to maintain is a limited number of filter resources per customer and to depend upon the CE firewall identifying which flows are mapped by which classifier. The PE classifier and traffic shaper 14 should therefore be able to operate with a small number of entries per customer. The limiting bound is how quickly the PE is able to reprogram its classification tables.

This functionality is particularly suitable for and could be added to any CE device that is connected to a PE router over a communication link 8 that is significantly slower than the links 18 into the PE router from a provider. The communication links 8 may be any suitable link such as an ADSL connection. In the ADSL scenario, where data is transferred over a significant distance on shared media, this setup mitigates waste of this shared resource. Thus data may be discarded before links which carry point-to-point data between the CE and the PE have wasted bandwidth. Examples of data networks that carry point-to-point data over shared resources are PPPoA (point-to-point over ATM) and point-to-point over Ethernet (PPPoE). In either case, the systems allows the shared bandwidth to be preserved, so delaying the point at which data is dropped at the ATM level owing to the way in which an ISP may have under-provisioned links for multiple customers.

Queues may be shared across customers in situations where customers share the same exchange or Asynchronous Transfer Mode (ATM) terminator.

An example of the operation of such a method will now be described. Consider the following PE filter characteristics for a PE router 6 sending data to a CE device 4.

TABLE 1

| EXT | PROCESS | SRC_ADDR | SRC_MASK | DST_ADDR | DST_MASK | PROTO | S PORT | D PORT |
|---|---|---|---|---|---|---|---|---|
| no | Discard | 2.2.2.2 | 255.255.255.255 | | | | | |
| yes | Priority | 1.2.3.4 | 255.255.255.255 | 3.4.5.6 | 255.255.255.255 | UDP | 7654 | 22 |
| no | Low | 8.66.2.0 | 255.255.255.254 | | | | | |
| no | High | 8.66.0.0 | 255.255.240.0 | | | | | |
| no | Low | 0.0.0.0 | 0.0.0.0 | | | | | |

In Table 1, EXT indicates if the ACL is extended or not, i.e. if the DST_ADDR, DST_MASK, PROTO, SPORT and DPORT columns should be consulted as part of deciding if a row matches.

Each row is consulted in order, from first to last row. As soon as a row has been matched, the PROCESS column is consulted to decide how to handle the packet. This will be one of discard/priority/low/high; respectively drop the packet/ place the packet in the priority queue/place the packet in the low bandwidth queue/place the packet in the high bandwidth queue.

The handling of the queues is such that, if there are any packets in the priority queue, these packets will always be sent to the communications link. Only when the priority queue is empty are the low and high bandwidth links consulted. Packets in the low and high bandwidth queues get equal access to the link, with the limitation that the amount of bandwidth used will be continually monitored such that the low bandwidth queue cannot exceed its percentage allocation of the available bandwidth. (e.g. the low bandwidth queue may be allocated 5% and the high bandwidth queue 95%).

The SRC_ADDR and SRC_MASK columns are used to compare against the source IP address in a packet. The comparison is done by taking the source IP address from the packet, performing a bitwise AND operation with the SRC_MASK column, and comparing with the SRC_ADDR entry. A match against the source address occurs if the result of this bitwise AND equals the SRC_ADDR column. Similarly for the DST_ADDR and DST_MASK columns, where the same bitwise AND operation and comparison is done, but against the destination IP address in the packet.

For a row where the EXT column is 'no', the row matches if a test against just the SRC_ADDR and SRC_MASK columns results in a match. For a row where the EXT column is 'yes', the row matches if a test against all columns (SRC_ADDR, SRC_MASK, DST_ADDR, DST_MASK, PROTO, SPORT, DPORT) results in a match.

The PROTO column is a test against the protocol field in the IP packet. For IP protocols which have the concept of source and destination port numbers (examples include TCP and User Datagram Protocol (UDP)), the SPORT and DPORT columns are used to test for a match between the corresponding fields in the protocol header part of the IP packet and the appropriate column. For IP protocols which do not have the concept of source and destination port numbers, the SPORT and DPORT columns will always be considered to match.

The above example given in Table 1 can be interpreted as:

First Row: drop all traffic received from the IP address 2.2.2.2, i.e. traffic from this source is considered to be attacking the device.

Second Row: all UDP protocol traffic from 3.4.5.6 (port 7654) to 1.2.3.4 (port 22) for the inter-agent communications protocol, and as such gets priority access to the communications link.

Fourth row: all traffic received from the range of IP addresses 8.66.0.0 through 8.66.15.255 (except 8.66.2.0 and 8.66.2.1) are given high bandwidth access to the link.

Third row: the two addresses 8.66.2.0 and 8.66.2.1 have low bandwidth access to the link. This is accomplished by the fact that the 3rd and 4th rows in the table are for overlapping addresses. The mask 255.255.255.254 is 31 bits followed by a zero bit. Therefore the last bit in the address is ignored. All other traffic received will match the last row of the table and, as such, is placed in the low bandwidth queue.

The same schemes apply to IPv6 as to IPv4. However in the IPv6 case the classification rules are more likely to use addresses and prefix lengths, than addresses and masks.

The characteristics of the filter (an example of which is shown in Table 1) are controlled by the PE agent 16 in response to control messages from the CE agent 12 associated with the CE device 4. The PE filter/classifier 14 is co-located with the PE device. However the PE agent 16 does not in and of itself have to be co-located with the PE device. It could be implemented in a separate device that reprograms the PE filter/classifier of a remote PE device.

Figure 3:
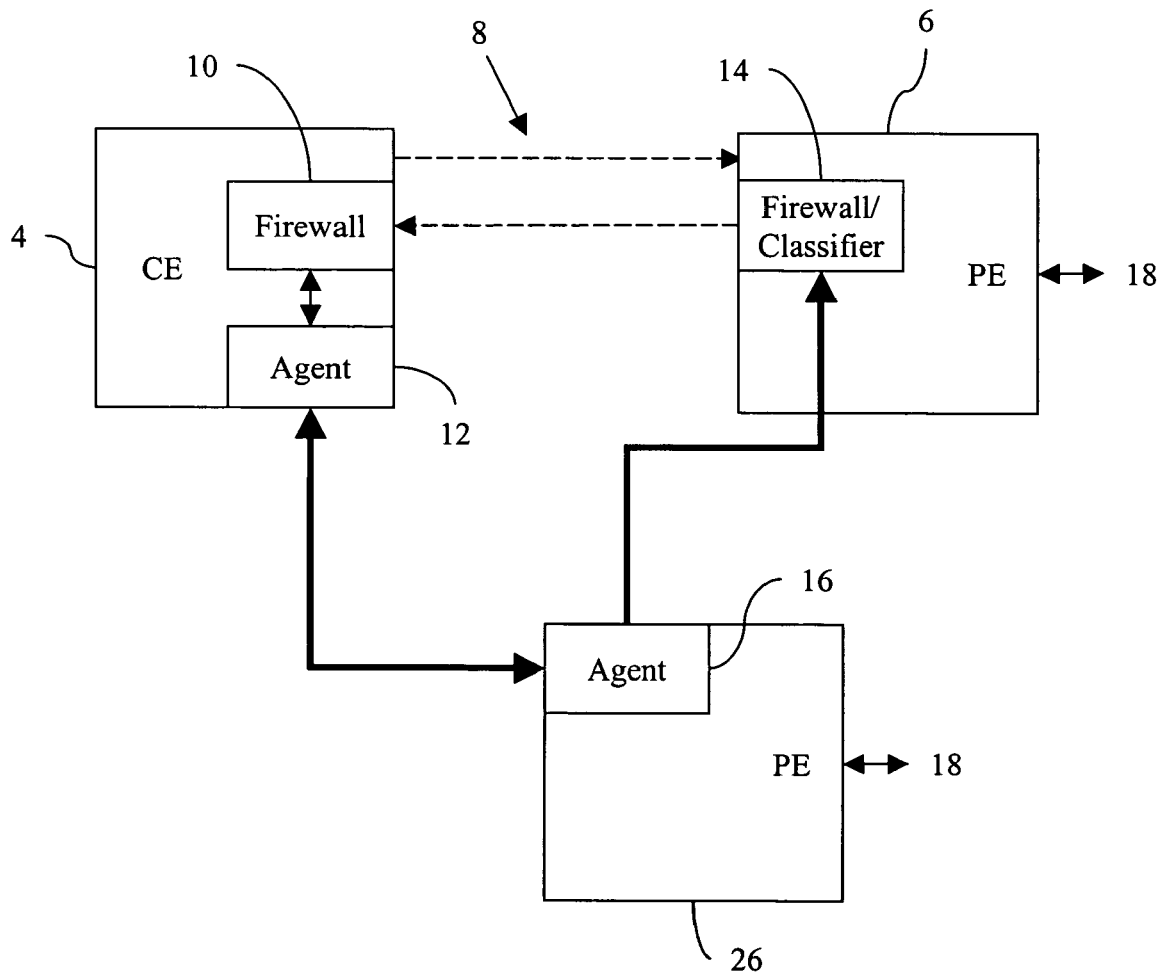
FIG. 3 is a schematic diagram illustrating a second embodiment of part of a data communications network.

FIG. 3 shows a further embodiment in which the PE agent 16 is not located with the PE device that is in data communication with the CE device 4. In this embodiment, a CE device 4 (such as a PC or a router of a customer) has a firewall 10 and software 12 (also known as an agent) that is associated with the firewall 10. The firewall 10 stores information relating to the CE device's active communications. The software 12 uses this information to control the flow of data from a PE router 6 to the CE device 4.

A second P device 26 has software 16 (also known as an agent) that, in response to control signals from the software 12 of the CE device 4, controls the filter characteristics of the PE router 6 in data communication with the CE device 4. Thus the first node (the CE device 4) sends inter-agent control messages from the first node to a second node (the PE router 26). The second node (P device 26) then sends device specific commands to a third node (PE Router 6) to alter the characteristics of the third node. Communications between the first node (device 4) and the second node (P device 26) passes via the third node (PE 6).

Since the PE agent 16 builds a similar database of active communications to that maintained on the CE 4 (though with some aggregation), elements may be stacked i.e. the PE agent 16 may itself act as a controlling agent with respect to another router. This ability to stack router/devices may be limited, for instance by the design of an ISP's network, the number of peer networks they connect to, the number of 'higher' level ISPs they get service from, and the loss of information that occurs as part of the aggregation. Three levels of stacking may be provided. In this scenario it may not be advisable to disable a source entirely, but only reduce its bandwidth.

In scenario's where the PE to CE link utilizes some shared media, the inter-agent communications protocol may need to be authenticated. This is to prevent one customer from attacking another customer by reprogramming their filters. Standard techniques, including cryptographic authentication codes, may be employed.

The implementation shown in FIG. 3 may be particularly attractive for ISPs. As the classification/policing element of the design is often a standard feature of software installs, an ISP could therefore implement the filter control by the simple addition of a box running the agent protocol. The box would then utilize the mechanisms the ISP already has in place to reprogram the classification rules in the PE box.

Using a separate Agent allows for heterogeneous device installations. i.e. the PE box(s) may be from differing manufacturers. This allows the Agent to be written as a simple tailoring device that does the appropriate translations to control the PE boxes.

The ISP informs the CE box of the address to contact to reach the PE agent. The ISP may wish to renumber the PE device. If the two logical functions (PE filter/classifier 14 and agent 16) have differing addresses, then this makes such re-configurations easier. Alternatively there may be provided means for automatically updating the configuration on the CE device if the PE agent ever changed its address. Having a separate address for the PE agent 16 also makes it easier to provide the agent in a separate unit, as shown in FIG. 3.

The implementation as shown in FIG. 3 also allows for the separation of function and technology. If an ISP wants to upgrade the PE devices, then by having this functionality at a separate address (i.e. box) they may have more options for control.

Thus there is provided a method of routing data in a data communications network in which a customer edge device directly or indirectly controls the characteristics of a filter at an associated Provider Edge router. This is achieved by the CE device controlling the characteristics of the filter based on the communications at the Customer Edge device. Should a CE device open a new flow from a source or determine that an attack appears to be underway from a source, a control message is sent to control the PE filter which causes the filter to assign packets to a particular queue, e.g. a high bandwidth queue in the case of a new flow and a drop queue in the case of an attack. Thus control of the filter of a PE device is handled from the CE device and is determined by flows of interest to the CE device.

3.0 Method of Routing Data in a Data Communications Network

Figure 4:
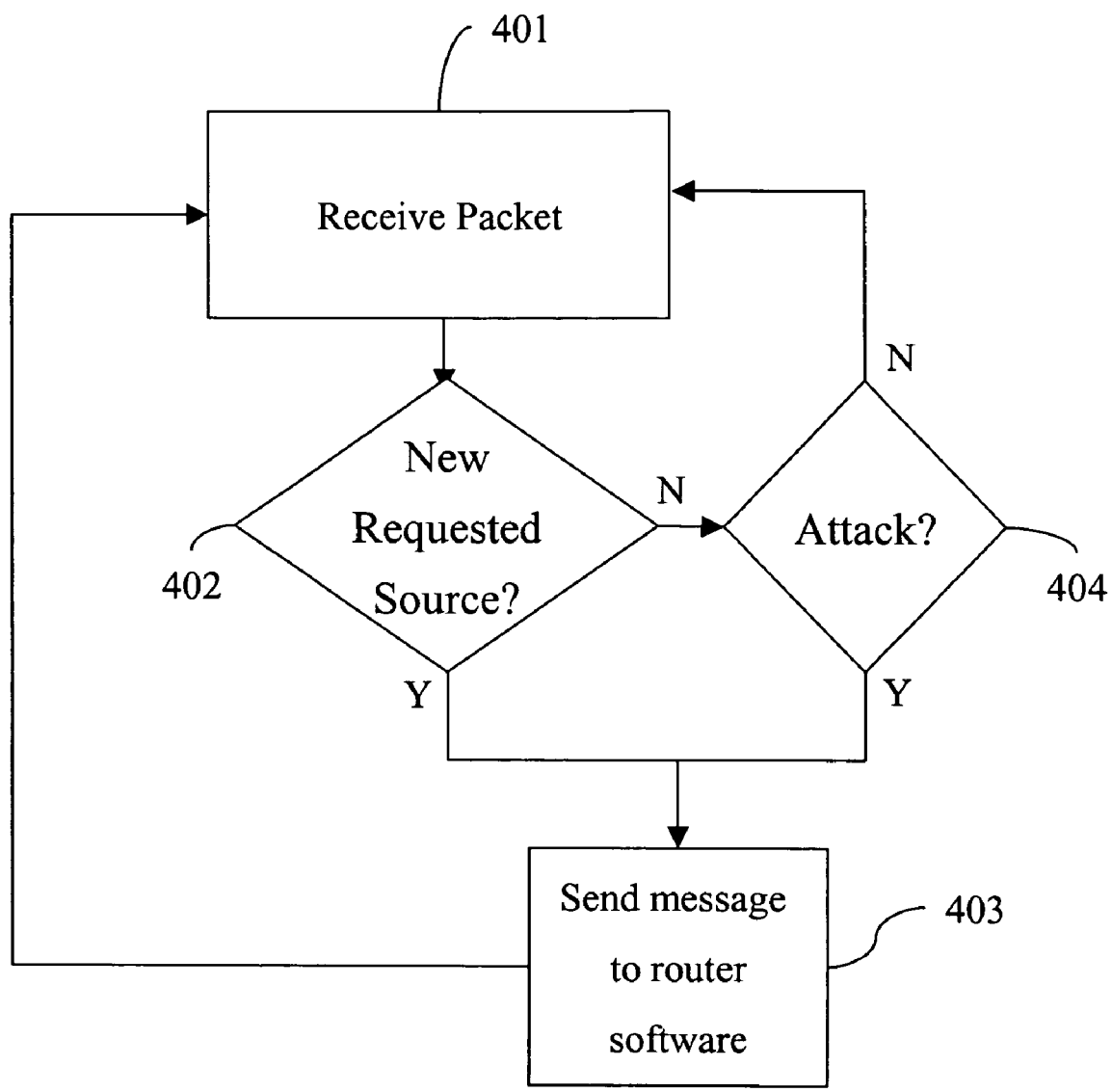
FIG. 4 is a flow diagram that illustrates a high level overview of one embodiment of a method for method of controlling data to be routed in a data communications network, as carried out at a customer edge device, e.g. by a firewall.

FIG. 4 is a flowchart illustrating the operation of a system as discussed above. FIG. 4 shows the operation at the end node (CE end) of the communication link 8. On receipt of a packet (step 401) the CE agent 12 of the CE determines whether the packet is from a new source (step 402) of interest to the CE device. This typically may be determined by the firewall saving information that a host associated with the CE device has sent out a request for information from a source. Once the CE device receives information from the requested source, the firewall stores information indicating that this is a new source of interest to a host associated with the CE device. If the packet is from a new source, the CE agent 12 then sends a message (step 403) to the PE agent 16 to indicate to the PE agent the source and mask and the required queue to which packets from that source are to be allocated. As, in one embodiment, the default setting at the PE agent is to allocate packets to the low bandwidth queue, the CE device 4 may be arranged to only send messages indicating that packets from a source are to be allocated to the drop or high bandwidth queue.

If the packets are not from a new source (step 402) but are from a source from which the firewall has previously received packets, then the CE agent 12 determines whether the packets from this source constitute an attack (step 404). If so, the CE agent 12 sends a message (step 403) to the router agent 16 indicating that packets from that source are to be allocated to the drop queue.

Figure 5:
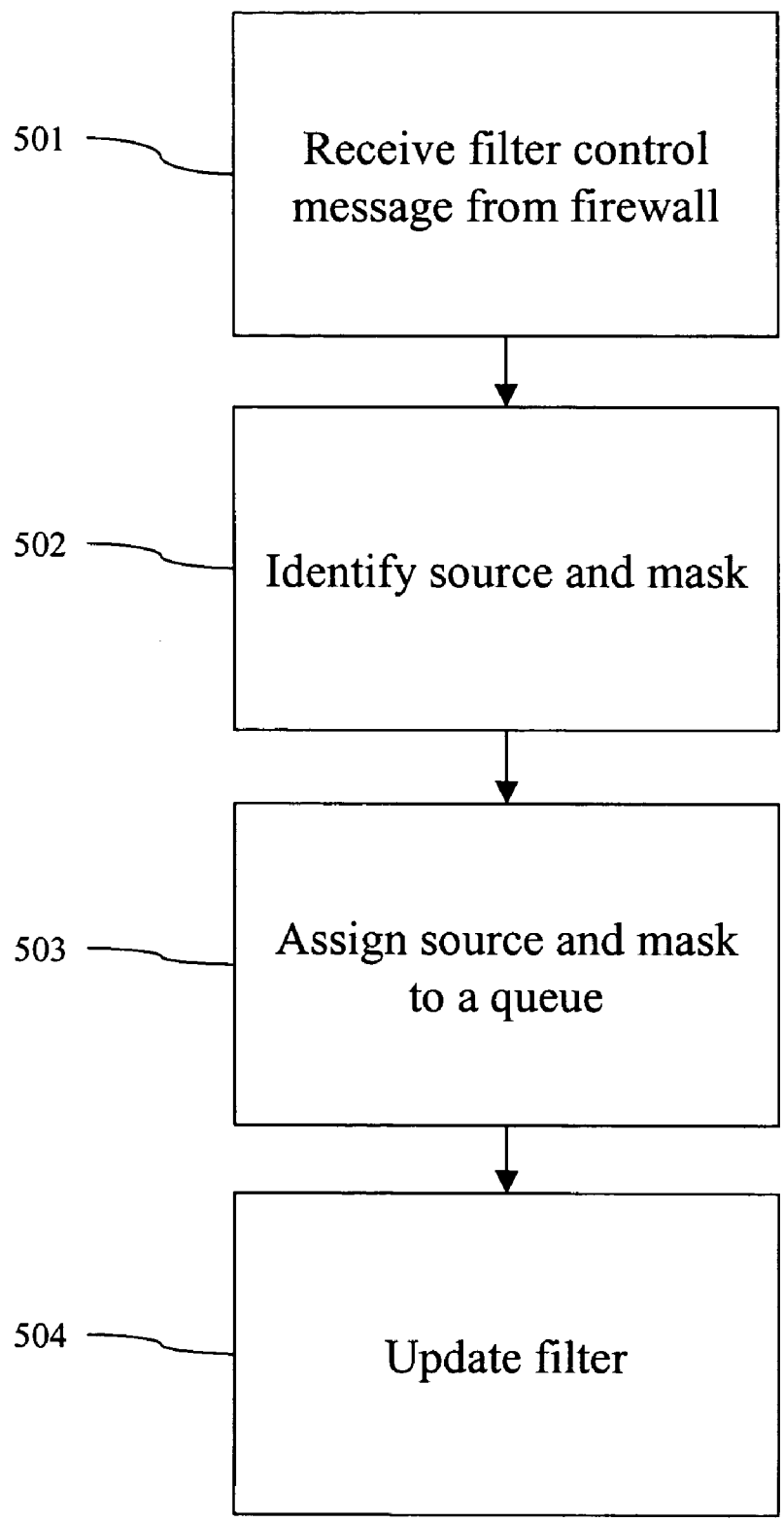
FIG. 5 is a flow diagram that illustrates a high level overview of one embodiment of a method for method of controlling data to be routed in a data communications network, as carried out at a sending router.

FIG. 5 illustrates the operation at the PE agent end of the communication link 8 on receipt of a message from the CE 4. On receipt of a filter control message from the CE (step 501), the PE agent 16 identifies the source and mask of the traffic flow to be controlled (step 502). The PE agent then assigns the source and mask to an appropriate queue (step 503) and then updates the characteristics of the classifiers in the filter 14 (step 504). In response, the PE filter/classifier 14 will therefore send packets to the CE device 4 packets as follows:

1. If the packet has a source/mask that is set in the filter 14 to be assigned to the high bandwidth queue, the packet is sent from the PE 6 to the CE 4 via the high bandwidth allocation of the communication link 8.
2. If the packet has a source/mask that is set in the filter 14 to be assigned to the drop queue, the packet is not sent from the PE 6 to the CE 4.
3. If the packet has a source/mask that is not set in the filter 14, the packet is sent from the PE 6 to the CE 4 via the low bandwidth allocation of the communication link 8.

Although four queues have been described, it will be clear to a person skilled in the art that the number of queues may be selected as appropriate.

4.0 Implementation Mechanisms—Hardware Overview

Figure 6:
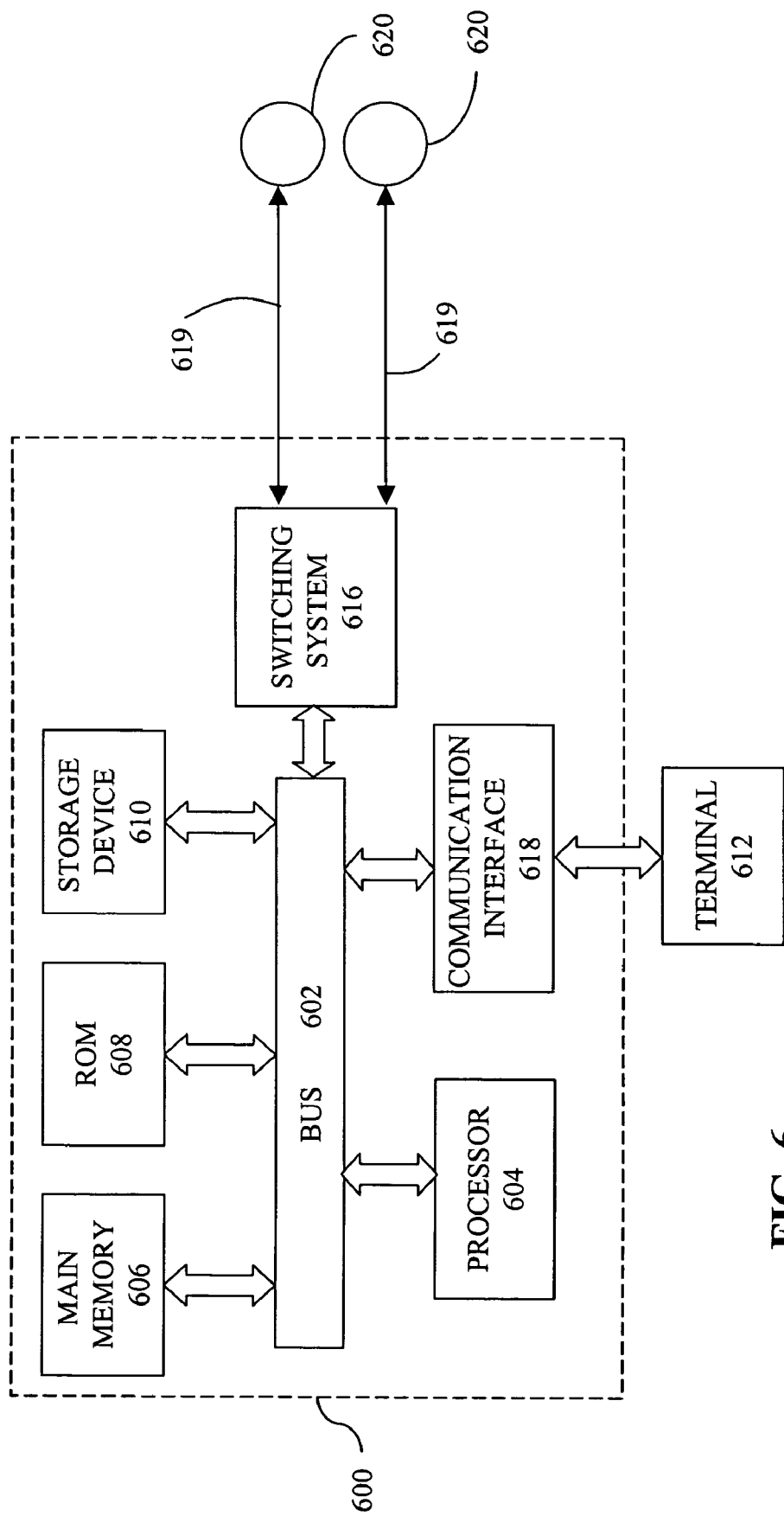
FIG. 6 is a block diagram that illustrates a computer system upon which an embodiment may be implemented.

FIG. 6 is a block diagram that illustrates a computer system 600 upon which the method may be implemented. The method is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 618. Firmware or software running in the computer system 600 provides a terminal interface or character-based command interface so that external commands can be given to the computer system.

A switching system 616 is coupled to bus 602 and has an input interface and a respective output interface (commonly designated 619) to external network elements. The external network elements may include a plurality of additional routers 620 or a local network coupled to one or more hosts or routers, or a global network such as the Internet having one or more servers. The switching system 616 switches information traffic arriving on the input interface to output interface 619 according to pre-determined protocols and conventions that are well known. For example, switching system 616, in cooperation with processor 604, can determine a destination of a packet of data arriving on the input interface and send it to the correct destination using the output interface. The destinations may include a host, server, other end stations, or other routing and switching devices in a local network or Internet.

The computer system 600 implements as a router acting as a node the above described method generating routing information. The implementation is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Interface 619 also provides a two-way data communication coupling to a network link that is connected to a local network. For example, the interface 619 may be an integrated services digital network (ISDN) card or a modem to provide a data communication connection to a corresponding type of telephone line. As another example, the interface 619 may be a local area network (LAN) card to provide a data communication connection to a compatible LAN. Wireless links may also be implemented. In any such implementation, the interface 619 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through the interface 619, which carry the digital data to and from computer system 600, are exemplary forms of carrier waves transporting the information.

Computer system 600 can send messages and receive data, including program code, through the network(s), network link and interface 619. In the Internet example, a server might transmit a requested code for an application program through the Internet, ISP, local network and communication interface 618. One such downloaded application provides for the method as described herein.

The received code may be executed by processor 604 as it is received, and/or stored in storage device 610, or other non-volatile storage for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of controlling data to be routed in a data communications network, the network comprising at least a first network node connected via a communications link to a second network node, the method comprising the computer-implemented steps of:

monitoring communications at the first network node, received at a firewall associated with the first network node;

wherein the first network node is in a customer communications network and the second network node is in a service provider communications network separate from the customer communications network; and detecting changes in the communications received at the firewall associated with the first network node;

in response to detecting changes in communications of data received from the firewall associated with the first network node by the first network node about the communications at the first network node, based on the detected changes, at the first network node, determining whether bandwidth needs to be reduced for data sent from a first identified source; and including in a filter control message information indicating how the bandwidth needs to be reduced by the second network node for the data destined for the first network node from the first identified source;

sending the filter control message to the second network node, said filter control message including information configured for updating filter characteristics at the second network node and configured for dynamically reducing the bandwidth for the data destined for the first network node from the first identified source.

2. A method as recited in claim 1, further comprising the steps of:

determining at the first network node when the first network node is under attack from a source; and sending a filter control message identifying the source and an action to be carried out to update the filter characteristics at the second network node, wherein the updated filter characteristics cause the second network node to drop data from the identified source without transmission to the first network node.

3. A method as recited in claim 1, wherein the first network node is an end node.

4. A method as recited in claim 1, wherein the second network node comprises a router.

5. A method as recited in claim 1, wherein the information indicating the bandwidth to be allocated for data from a source comprises an indicator relating to one of a plurality of limited bandwidths.

6. The method as recited in claim 1, wherein the information indicating the bandwidth to be allocated for data from a source comprises an indicator relating to one of a high bandwidth queue, low bandwidth queue or no bandwidth queue.

7. A method as recited in claim 1, further comprising sending the filter control message to the second network node.

8. A method as recited in claim 1, further comprising sending the filter control message to a third network node, the third network node in response sending a filter control message to the second network node.

9. A method as recited in claim 1, wherein the filter control message is authenticated.

10. A method of controlling data to be routed in a data communications network, the network comprising at least a first network node connected via a communications link to a second network node, the method comprising the computer-implemented steps of:

at the second network node, receiving a filter control message from the first network node indicating how bandwidth needs to be reduced by the second network node for data destined for the first network node from a first identified source, wherein the filter control message is determined by the first network node in response to detecting changes in communications at the first network node and based on the detected changes in the communications of data received from a firewall associated with the first network node and about communications at the first network received at the first network node;

wherein the first network node is in a customer communications network and the second network node is in a service provider communications network separate from the customer communications network;

and in response to the filter control message, updating filter characteristics at the second network node and configured for dynamically reducing the bandwidth for the data destined for the first network node from the first identified source.

11. A method as recited in claim 10, further comprising the steps of:
receiving a filter control message from the first network node identifying a source and information indicating that data from the source is not to be forwarded to the first network node; and
in response, updating the filter characteristics at the second network node, wherein the updated filter characteristics cause the second network node to drop data from the identified source without transmission to the first network node.

12. A method as recited in claim 10, wherein the first network node is an end node.

13. A method as recited in claim 10, wherein the second network node comprises a router.

14. A method as recited in claim 10, wherein the second network element is arranged to allocate data from sources to one of a plurality of limited bandwidths.

15. A method as recited in claim 10, wherein the second network element is arranged to allocate data from sources to one of a high bandwidth queue, low bandwidth queue or no bandwidth queue.

16. A method as recited in claim 10, further comprising sending the filter control message to the second network node.

17. A method as recited in claim 10, further comprising receiving the filter control message from the first network node via a third network node, the third network node in response to receiving a filter control message from the first network node sending a filter control message to the second network node.

18. A method as recited in claim 10, wherein the filter control message is authenticated.

19. A computer-readable storage medium for carrying one or more sequences of instructions for controlling data to be routed in a data communications network, the network comprising at least a first network node connected via a communications link to a second network node, which instructions, when executed by one or more processors, cause the one or more processors to carry out the steps of:
monitoring communications at the first network node, received at a firewall associated with the first network node;
wherein the first network node is in a customer communications network and the second network node is in a service provider communications network separate from the customer communications network; and
detecting changes in the communications received at the firewall associated with the first network node;
in response to detecting changes in the communications of data received from the firewall associated with the first network node by the first network node, based on the detected changes, at the first network node, determining whether bandwidth needs to be reduced for data from a first identified source; and including in a filter control message information indicating how the bandwidth needs to be reduced by the second network node for data destined for the first network node from the first identified source;
sending the filter control message to the second network node, so as to update filter characteristics at the second network node and configured for dynamically reducing the bandwidth for the data destined for the first network node from the first identified source.

20. A computer-readable storage medium as recited in claim 19, further comprising instructions which, when executed by the one or more processors, cause the one or more processors to carry out the steps of:
determining at the first network node when the first network node is under attack from a source; and
sending a filter control message identifying the source and an action to be carried out to update the filter characteristics at the second network node, wherein the updated filter characteristics cause the second network node to drop data from the identified source without transmission to the first network node.

21. A computer-readable storage medium for carrying one or more sequences of instructions for controlling data to be routed in a data communications network, the network comprising at least a first network node connected via a communications link to a second network node, which instructions, when executed by one or more processors, cause the one or more processors to carry out the steps of:
receiving at the second node a filter control message from the first network node indicating how bandwidth needs to be reduced by the second network node for data destined for the first network node from a first identified source, wherein the filter control message is determined by the first network node in response to detecting changes in communications at the first network node and based on the detected changes in the communications at the first network node and about communications at the first network node received at the first network node;
wherein the first network node is in a customer communications network and the second network node is in a service provider communications network separate from the customer communications network;
and
in response to the filter control message, updating filter characteristics at the second network node and configured for dynamically reducing the bandwidth for the data destined for the first network node from the first identified source.

22. A computer-readable storage medium as recited in claim 21, further comprising instructions which, when executed by the one or more processors, cause the one or more processors to carry out the steps of:
receiving a filter control message from the first network node identifying a source and information indicating that data from the source is not to be forwarded to the first network node; and
in response, updating the filter characteristics at the second network node, wherein the updated filter characteristics cause the second network node to drop data from the identified source without transmission to the first network node.

23. An apparatus for controlling data to be routed in a data communications network, the network comprising at least a first network node connected via a communications link to a second network node, the apparatus comprising:
means for monitoring communications at the first network node, received at a firewall associated with the first network node;
wherein the first network node is in a customer communications network and the second network node is in a service provider communications network separate from the customer communications network; and
means for detecting changes in the communications received at the firewall associated with the first network node;

means, responsive to detecting changes in communications of data received from the firewall associated with the first network node by the first network node about the communications at the first network node, for determining, at the first network node, whether bandwidth needs to be reduced for data destined to the first network node from a first identified source; and for including in a filter control message information indicating how the bandwidth needs to be reduced by the second network node for the data destined for the first network node from the first identified source; and means for sending the filter control message to the second network node, so as to update filter characteristics at the second network node and configured for dynamically reducing the bandwidth for the data destined to the first network node from the first identified source.

24. An apparatus for controlling data to be routed in a data communications network, the network comprising at least a first network node connected via a communications link to a second network node, the apparatus comprising:

means for receiving at the second node a filter control message from a first network node indicating how bandwidth needs to be reduced by the second network node for data destined for the first network node from a first identified source;
wherein the filter control message is determined at the first network node in response to detecting changes in communications at the first network node and based on detected changes in the communications of data in the communications at the first network node received from the firewall associated with the first network node and about communications at the first network received at the first network node, and determined to modify filter characteristics for the second network node, and
wherein the first network node is in a customer communications network and the second network node is in a service provider communications network separate from the customer communications network; and means, responsive to the filter control message, for updating filter characteristics at the second network node and configured for dynamically reducing the bandwidth for the data destined for the first network node from the first identified source.

25. An apparatus for controlling data to be routed in a data communications network, the network comprising at least a first network node connected via a communications link to a second network node and a third network node, the apparatus comprising:

means for receiving at the third node a filter control message from a first network node indicating how bandwidth needs to be reduced by the second network node for data destined for the first network node from the a first identified source, wherein the filter control message is determined at the first node based on detected changes in communications of data received from a firewall associated with the first network node and about communications at the first network node received at the first network node;
wherein the first network node is in a customer communications network and the second network node is in a service provider communications network separate from the customer communications network; and means, responsive to the filter control message, for sending a filter control message to the second network node, so as to update filter characteristics at the second network node and configured for dynamically reducing the bandwidth for the data destined for the first network node from the first identified source.

26. An apparatus for controlling data to be routed in a data communications network, the network comprising at least a first network node connected via a communications link to a second network node, the apparatus comprising:

a network interface that is coupled to the data network for receiving and transmitting one or more packet flows;
a processor;
one or more stored sequences of instructions which, when executed by the processor, cause the processor to carry out the steps of:
monitoring communications at the first network node, received at a firewall associated with the first network node;
wherein the first network node is in a customer communications network and the second network node is in a service provider communications network separate from the customer communications network; and
detecting changes in the communications received at the firewall associated with the first network node;
in response to detecting changes in communications of data received from the firewall associated with the first network node by the first network node about the communications at the first network node, based on the detected changes, at the first network node, determining whether bandwidth needs to be reduced for data from a first identified source; and including in a filter control message information indicating how the bandwidth needs to be reduced by the second network node for data destined for the first network node from the first identified source;
sending the filter control message to the second network node, said filter control message including information configured for updating filter characteristics at the second network node and configured for dynamically reducing the bandwidth for the data destined for the first network node from the first identified source.

27. An apparatus for controlling data to be routed in a data communications network, the network comprising at least a first network node connected via a communications link to a second network node, the apparatus comprising:

a network interface that is coupled to the data network for receiving and transmitting one or more packet flows;
a processor;
one or more stored sequences of instructions which, when executed by the processor, cause the processor to carry out the steps of:
at the second network node, receiving a filter control message from the first network node indicating whether bandwidth needs to be reduced by the second network node for data destined for the first network node from a first identified source, wherein the filter control message is determined by the first network node based on detected changes in communications of data received from a firewall associated with the first network node and about communications at the first network node received at the first network node;
wherein the first network node is in a customer communications network and the second network node is in a service provider communications network separate from the customer communications network; and
in response to the filter control message, updating filter characteristics at the second network node and configured for dynamically reduced the bandwidth for the data destined for the first network from the first identified source.

28. An apparatus for controlling data to be routed in a data communications network, the network comprising at least a first network node connected via a communications link to a second network node, the apparatus comprising:

a network interface that is coupled to the data network for receiving and transmitting one or more packet flows;
a processor;
one or more stored sequences of instructions which, when executed by the processor, cause the processor to carry out the steps of:
means for receiving at the third node a filter control message from a first network node indicating whether bandwidth needs to be reduced by the second network node for data destined for the first network node from a first identified source, wherein the filter control message is determined at the first node based on data received from a firewall associated with the first network node and about communications at the first network node received at the first network node;
wherein the first network node is in a customer communications network and the second network node is in a service provider communications network separate from the customer communications network; and
means, responsive to the filter control message, for sending a filter control message to the second network node, so as to update filter characteristics at the second network node and configured for dynamically reducing the bandwidth for the data destined for the first network node from the first identified source.

29. A method of controlling data to be routed in a data communications network, the network comprising at least a first network node connected via a communications link to a second network node, the method comprising the computer-implemented steps of:

monitoring communications at the first network node received at a firewall associated with the first network node;
wherein the first network node is in a customer communications network and the second network node is in a service provider communications network separate from the customer communications network;
detecting changes in the communications received at the firewall associated with the first network node;
in response to detecting changes in communications of data received from the firewall associated with the first network node by the first network node about the communications at the first network node, based on the detected changes, at the first network node, determining whether bandwidth needs to be reduced by the second network node for data from a first identified source; and including in a filter control message information indicating how the bandwidth needs to be reduced by the second network node for data destined for the first network node from the first identified source;
sending the filter control message to the second network node, said filter control message including information configured for updating filter characteristics at the second network node to dynamically reduce the bandwidth for the data destined for the first network node from the first identified source;
receiving at the second node the filter control message from the first network node; and
in response to the filter control message, updating filter characteristics at the second network node and configured for dynamically reducing the bandwidth for the data destined for the first network node from the first identified source.

* * * * *